UNITED STATES PATENT OFFICE.

CLIFFORD H. OAKLEY, OF TRENTON, NEW JERSEY.

PROCESS FOR MAKING RUBBER-IMPREGNATED FABRIC FOR BRAKE-LININGS, &c.

1,292,027.

Specification of Letters Patent. Patented Jan. 21, 1919.

No Drawing. Application filed June 20, 1911, Serial No. 634,295. Renewed June 15, 1918. Serial No. 240,252.

*To all whom it may concern:*

Be it known that I, CLIFFORD H. OAKLEY, a citizen of the United States, and a resident of Trenton, Mercer county, State of New Jersey, have invented an Improvement in Processes for Making Rubber-Impregnated Fabric for Brake-Linings, &c., of which the following description is a specification.

Solidly woven asbestos tape, of various thicknesses and widths, affords a very efficient lining for all sorts of friction brakes, particularly those used on automobiles. This material, however, is invariably treated with various compositions before being placed in service, for the purpose of impregnating the fibers of asbestos (or rather, filling the interstices) in order to present a smooth and more compact surface to the abrasive action of the brake. It is desirable that the impregnating material, or filler, shall be such as will increase the adhesion between the moving and the stationary portions of the friction brake, without biting too hard when the brake is thrown into action, and such as will retain its frictional qualities until the brake-lining is entirely worn out. For this purpose rubber has been found in practice to be an excellent impregnating material or filler; in fact, the results of recent tests show that rubber is more efficient in this connection than any other known substance. But the difficulty has been to impregnate an asbestos brake-lining with rubber so as to produce a thoroughly homogeneous mass.

Asbestos tape, as originally woven for use as brake-lining, is very compact and close in its construction, for which reason surface applications of impregnating material will not uniformly permeate the entire structure. Now, thorough permeation or impregnation is absolutely essential to produce a brake-lining that will work uniformly well with continued use; for, as the lining wears away in service, its efficiency becomes less and less provided the impregnation is substantially confined to the surface. Again, if the asbestos yarns are treated with rubber before weaving them into a fabric, the natural cohesion or sticking which takes place between the yarns as they are being woven, greatly interferes with the work of the loom; and if such common mineral lubricants as talc, soap-stone, plumbago, etc., are employed as temporary expedients, they are found to interfere, later on, with the vulcanizing and otherwise firm uniting together of the woven fabric to form the brake-lining.

With such difficulties in the way of producing a thoroughly permeated rubber-asbestos brake-lining by starting with rubber-coated yarns, the art at the present time is practised either by impregnating the solidly woven fabric from the surface as well as may be, or by forming the lining from several thinly woven layers each of which is impregnated before as a whole, they are vulcanized together. This latter method is generally accomplished by folding over several times a thin piece of impregnated fabric, and is known as the folding method. It produces a sort of interstitially impregnated mass which obviously lacks the strength of a solidly woven structure; and strength is one prime essential of brake-linings.

To avoid the objections which both of these methods give rise to, and to produce a thoroughly impregnated and homogenous structure throughout which will wear away uniformly in service and have a constant efficiency from beginning to end, I construct my brake-lining in accordance with the following process, to wit: I first treat the yarns to provide them with a rubber coating, this step being accomplished preferably by passing the yarns through a bath of rubber dissolved in some suitable solvent as ether, bisulfid of carbon, etc.; thereafter the solvent is permitted to escape from the treated yarns by evaporation or heating or in some other way, leaving, of course, a coating of rubber adhering to the yarns. This step may obviously be practised in such a way as to recover or reclaim the solvent employed. Then, or during this step, but previously to weaving, sulfur, or other vulcanizing agent, or a vegetable substance is applied to the coated yarns, as by dusting powdered starch thereon, or by passing the yarn through a volatile liquid having starch or some other combustible lubricant suspended thereon, in order to serve as a lubricant and prevent the yarns from sticking during the weaving operation which follows next and is carried out by means of a suitable loom.

The weaving is done in such a way as to produce a solidly woven tape throughout, that is, one in which the yarns, of which it consists, are interwoven throughout. Thereafter, the tape is vulcanized, and preferably this vulcanization takes place under considerable pressure whereby a uniform and homogeneous and closely compacted structure is produced, and one which will be of sufficient consistency and strength to hold the copper rivets or other fastening devices usually employed to fasten the lining in proper position in the brake. The presence of sulfur, or other vulcanizing agent or a vegetable substance, such as starch, does not interfere with the vulcanizing or combining operation or affect the finished product. In fact, the starch is carbonized at the same time that the rubber is vulcanized and becomes incorporated in the latter.

In the foregoing description, it has been assumed that the yarns referred to were asbestos yarns; but as it does not seem necessary to limit the invention wholly to asbestos yarns, except where those are specified herein, it will be understood that the yarns may be of various materials. Moreover, where the word "rubber" is used in the claims which follow, it should be understood to include obvious equivalents such as rubber composition and similar gums.

Finally, it should be observed that the present method of producing brake-linings enables these latter to be formed with great accuracy as to their dimensions which are required to be quite exact in order that the linings shall fit the braking apparatus for which they are intended; for it is obvious that by the vulcanizing and pressing operation, which forms the last step of the present process, the width and thickness of the lining may be determined to a nicety.

I claim as my invention:

1. The process of making rubber impregnated fabric which consists in coating yarns with rubber, treating the coated yarns with a lubricant, weaving them, and carbonizing the lubricant on the woven yarns under pressure.

2. The process of making brake lining which consists in coating asbestos yarns with rubber by treating them with a solution of rubber, allowing the rubber solvent to evaporate from the yarns so treated, applying powdered starch to the coated yarns as a lubricant to facilitate weaving, weaving the same, and subjecting both the coated yarns and the starch thereon to a vulcanizing treatment.

In testimony whereof, I have signed my name to this specification in the presence of two subscribing witnesses.

CLIFFORD H. OAKLEY.

Witnesses:
JOHN W. THOMPSON,
LUCIUS E. VARNEY.